United States Patent [19]

Leibhard et al.

[11] 4,269,106
[45] May 26, 1981

[54] DOWEL FOR A HOLLOW WALL STRUCTURE

[75] Inventors: Erich Leibhard; Heinz Gruenewald, both of Munich; Hanno Richter, Unterhaching, all of Fed. Rep. of Germany

[73] Assignee: Hilti Aktiengesellschaft, Schaan, Liechtenstein

[21] Appl. No.: 15,611

[22] Filed: Feb. 27, 1979

[30] Foreign Application Priority Data

Mar. 6, 1978 [DE] Fed. Rep. of Germany ....... 2809644

[51] Int. Cl.³ .............................................. F16B 13/06
[52] U.S. Cl. .................... 411/34; 10/86 R; 411/38
[58] Field of Search ............... 85/71, 70, 9 W, 35, 85/85, 32 W; 113/116 H, 119; 10/86 R

[56] References Cited

U.S. PATENT DOCUMENTS

| 2,396,501 | 3/1946 | Gibson | 85/71 |
|---|---|---|---|
| 2,477,430 | 7/1949 | Swanstrom | 85/32 WE |
| 2,538,601 | 1/1951 | Taylor et al. | 85/71 |
| 2,559,281 | 7/1951 | Croessant | 85/71 |
| 3,316,796 | 5/1967 | Young | 85/71 X |
| 3,398,627 | 8/1968 | Tendler | 85/71 |
| 3,718,068 | 2/1973 | Passer | 85/71 |
| 3,888,156 | 6/1975 | Fima | 85/71 |
| 4,123,961 | 11/1978 | Chaivre | 85/35 |

FOREIGN PATENT DOCUMENTS

| 144117 | 11/1951 | Australia | 85/71 |
|---|---|---|---|
| 2328385 | 12/1973 | Fed. Rep. of Germany | 85/71 |
| 608218 | 9/1948 | United Kingdom | 85/71 |

*Primary Examiner*—Ramon S. Britts
*Attorney, Agent, or Firm*—Toren, McGeady and Stanger

[57] ABSTRACT

A dowel, arranged to secure an article to the surface of a receiving material having a hollow space within it into which the dowel extends, is formed of an axially elongated dowel body and a flange member at one end of the dowel body. The flange member includes a flange part extending transversely outwardly of the dowel body. The dowel body is formed from a strip of material and includes an end part extending transversely of the axial direction of the dowel body with a threaded opening through the end part, and a pair of axially extending legs divided into webs and extending in the axial direction of the dowel body from the end part. Inwardly directed recesses are formed in the ends of the legs spaced from the end part. The flange member includes a sleeve-shaped projection extending generally perpendicularly of the flange part. The sleeve-shaped projection fits into the ends of the legs, and the dowel body and flange member are welded together at the locations where the recesses in the legs contact the sleeve-shaped projection on the flange member.

9 Claims, 2 Drawing Figures

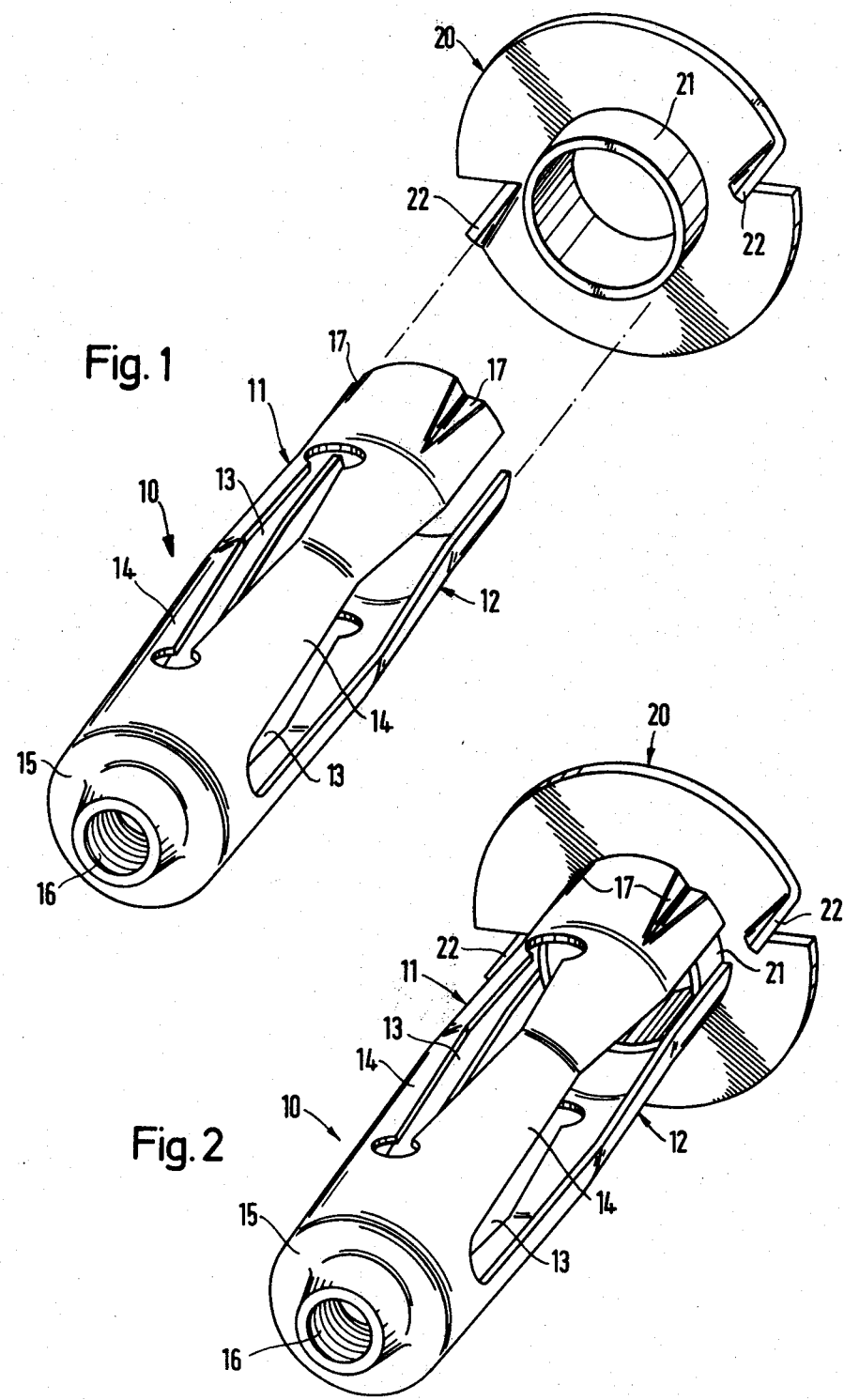

DOWEL FOR A HOLLOW WALL STRUCTURE

SUMMARY OF THE INVENTION

The present invention is directed to a dowel particularly useful in attaching articles to a receiving material, such as a wall or ceiling, which has a hollow space inwardly of the surface into which the dowel extends. The dowel is formed of a generally tubular shaped dowel body with a flange member on its trailing end. The dowel body includes webs which buckle or deform radially outwardly when an axially compressive force is applied. The flange member includes a flange portion and a sleeve-like projection extending from the flange portion into the trailing end of the dowel body.

In addition to conventional expansion dowels, special dowels are known for attaching articles to the surface of a receiving material, such as a wall or ceiling, containing a hollow space inwardly of the surface into which the dowel projects. After the dowel is inserted, an axially compressive force is applied deforming the portion of the dowel within the hollow space radially outwardly into engagement with the surface of the receiving material within the space through which the dowel has passed so that the dowel is held in position.

Where such dowels are exposed to rather high stresses and where it is likely that the article attached may be subsequently removed, sheet metal dowels are used into which a metal screw or bolt can be threaded for providing the axially compressive stress as well as the attachment of the article to the receiving material surface. Such dowels include a generally tubular shaped dowel body formed of webs which can be deformed radially outwardly and an end part, extending transversely of the webs, forms the leading end of the dowel body and contains a threaded opening. After the dowel body is inserted through an aperture and extends into the hollow space in the receiving material, the webs forming the dowel body are exposed to an axially compressive force by means of a threaded bolt or screw or by a special insertion tool, so that the webs buckle or deform radially outwardly and engage the surface of the receiving material within the hollow space. On the trailing end of the dowel body a flange member is provided which extends radially outwardly from the dowel body and the flange member includes a sleeve-type projection. The flange part of the flange member serves as a stop when the dowel is inserted into the receiving material and also provides a locking or holding action against rotation of the dowel.

In known dowels, the dowel body is usually formed by rolling a piece of sheet metal into a tubular or sleeve-like member and then butting the trailing end of the sleeve member against a flange member and securing the two parts together by welding, soldering or the like. The leading end of the sleeve member, that is the opposite end from the flange member, is provided with a thread by attaching an additional threaded bushing inserted into the leading end of the sleeve. Producing such a dowel is very cumbersome and results in high production costs. Moreover, a dowel produced in this manner may present problems if the trailing end of the dowel body, which is attached to the flange member, is not exactly planar, that is, it is located in a plane normal to the axis of the dowel body.

The primary object of the present invention is to provide a simpler and more economical process for the formation of a dowel assembly.

In accordance with the present invention, axially extending legs of a tubular shaped dowel body are welded in the radial direction to a sleeve-type projection on a flange member. Therefore, the flange part of the flange member can be connected to the dowel body even if the trailing end of the dowel body is not exactly planar, that is, the trailing end does not extend normally to the axis of the dowel body. In other words, even if the legs formed by the dowel body are not of equal lengths, the flange part of the flange member can be arranged substantially perpendicularly of the dowel body. Furthermore, the outside diameter of the dowel body can be maintained essentially constant, because the webs forming the axially extending portion of the dowel body are pressed against the sleeve-type projection on the flange member during the welding operation.

To obtain an adequate welding of the dowel body to the flange member, it is suggested that the trailing ends of the deformable legs are provided with inwardly directed recesses formed radially inwardly relative to the axial direction of the dowel body. The inwardly directed recesses form welding points or lines along which the dowel body is welded to the flange member. Therefore, the welding takes place along the radially inwardly directed recesses by a resistance-welding process which is particularly suitable for mass production. The radially inwardly directed recesses in the web members can be formed in the same operation with the formation of the dowel body, accordingly, no additional expenditure is involved in the formation of the recesses. The location of the welds defined by the axially extending recesses results in an unobjectionable connection of these parts. As a result, an adjustment can be made for any existing fabrication tolerances between the dowel body and the flange member.

For the economical fabrication of the dowel body, the transversally extending end part and the axially extending legs should, as far as possible, be formed from a single piece of material. Accordingly, the legs are bent approximately perpendicularly from the end part which forms the leading end of the dowel body. The axially extending legs form the deformable webs of the dowel. Therefore, the dowel body is produced from a stamped out strip of material forming both of the legs and the end part from which the legs are bent. With this arrangement, a minimum amount of the material forming the dowel body is wasted.

The legs of the dowel body which form the deformable webs should be, as far as possible, of the same length. To provide this equal length feature, it is preferable if the threaded opening is arranged in the center of the end part coaxial with the axis of the dowel body. In such an arrangement, the threaded opening can be produced before the dowel body is folded into shape from the elongated strip of material and the threaded opening can be used for centering the formation of the strip and the bending of the strip into the dowel body. Since the threaded opening is centered in the end part, it is also possible to form the opening after the legs have been bent relative to the end part.

To prevent the dowel from rotating after it has been inserted into a receiving material, especially when a screw or bolt is being threaded into the end part of the dowel, the flange portions of the dowel have been provided with bent tabs facing toward the leading end of the dowel. In the known dowels, these tabs are arranged so that they are bent approximately 180° if the dowel is rotated in contact with a hard receiving material with the result that the tabs are bent over double against the flange portion of the dowel. If the tab is bent over double, it prevents the surface of the flange portion from moving into direct contact with the surface of the receiving material, and, as a result, the article mounted on the receiving material is spaced outwardly from it by the additional dimension of the bent over tab. To prevent such a disadvantageous arrangement, tabs are bent out of the flange portion of the dowel which present a free or leading edge facing in the screwing-in-direction of the dowel. With the tabs bent in this manner, if there is a tendency for the dowel to rotate, the tabs do not tend to bend or fold over upon themselves as happens in the prior art. On the contrary, if the dowel tends to rotate, the tabs are simply bent back into the plane of the flange portion, while at the same time preventing any rotation of the dowel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a perspective view of a dowel embodying the present invention with the individual parts of the dowel shown in an exploded arrangement; and FIG. 2 is a perspective view, similar to FIG. 1, however illustrating the parts of the dowel assembled together.

DETAIL DESCRIPTION OF THE INVENTION

As can be seen in FIG. 1, the dowel embodying the present invention consists of a dowel body 10 and a flange member 20. FIG. 1 shows the parts in an exploded arrangement before they are assembled together. The dowel body 10 which in its final shape has a generally tubular form, consists of a strip of sheet metal consisting of an end part 15 extending transversely of two elongated legs 11, 12 which extend opposite one another from the end part and form the tubular portion of the dowel body.

Each of the legs 11, 12 has a slot 13 extending in the axial direction of the dowel body 10 with the ends of the slots being spaced inwardly from the adjacent ends of the legs. The slots 13 divide each leg into axially extending webs 14 which deform or buckle radially outwardly when an axially compressive force is applied to the dowel body. As viewed in FIGS. 1 and 2 the left hand or lower end of the dowel body is its leading end, that is, the end which is first inserted through the receiving material when the dowel is inserted into position. The leading end of the dowel body is provided by the end part 15 extending transversely of the axial direction of the dowel body, that is, transversely of the legs 11, 12. End part 15 has a centrally arranged threaded opening 16. The threaded opening 16 serves to receive a screw or threaded bolt which is screwed into the threaded opening and provides the axially directed compressive force for deforming the dowel body. As can be seen in FIGS. 1 and 2, the legs of the dowel body have an arcuate shape in transverse section. Further, the axially extending edges of the legs 11,12 are spaced apart so that these edges form a slot-like arrangement therebetween. The trailing end of each of the legs 11, 12 is provided with radially inwardly directed recesses 17, in transverse section the recesses 17 have a V-shaped configuration. The recesses 17 facilitate the welding of the dowel body 10 to the flange member 20.

The flange member 20 includes a flange part extending transversely and radially outwardly from the outside diameter of the dowel body and a sleeve-shaped projection 21 extending substantially perpendicularly from the flange part. The sleeve-shaped projection 21 is located on the side of the flange part facing toward the dowel body, note FIG. 1. The projection 21 serves to center the flange member on the trailing end of the dowel body 10 and also provides a surface for welding the webs 14, making up the legs 11 and 12, to the projection 21 of the flange member 20. The outer diameter of the annular flange portion of the flange member 20 is considerably larger than the outer diameter of the dowel body 10 so that the flange part extends radially outwardly from the dowel body 10. At the periphery of the flange part of the flange member 20 there are bent tabs 22 which serve to prevent rotation of the dowel. The tabs 22 are bent up out of the plane of the flange part toward the leading end of the dowel body. The tabs 22 are bent up out of the plane of the flange part so that upon contact with the receiving surface as the flange tends to move in the screwing-in direction of the threaded openings 16, the tabs tend to return into the plane of the flange part. The tabs engage the surface of the receiving material and dig into the surface if the receiving material is soft. If, however, the receiving material is hard, the tabs are bent back into the plane of the flange part of the flange member if rotation of the dowel takes place. Such an arrangement guarantees a close fit between the flange part and the surface of the receiving material.

In FIG. 2 an assembled dowel is illustrated with the dowel body and the flange member welded together. The trailing end of the tubular shaped dowel body is fixed over the sleeve-type projection 21 of the flange member and the inwardly pressed recesses 17 on the dowel body are fixed to the projection 21 by resistance welding. As a result, the trailing ends of the legs 11, 12 are welded to the projection 21. The method of forming the dowel body has the advantage that any axial or length differences in the legs 11, 12 can be compensated when the flange member 20 is fixed into the dowel body with the flange part being arranged perpendicularly of the axis of the dowel body. The threaded opening 16 in the end part 15 of the dowel body serves to center the two parts when they are being assembled.

In use, the dowel body 10 is inserted into an opening formed in a receiving material so that a portion of its legs 11 and 12 and its end part extend through the receiving material into a hollow space. The flange member 20 or at least its tabs 22 contact the surface of the receiving material. When a bolt or screw is threaded into the threaded opening 16, in securing an article, not shown, to the surface of the receiving material, not shown, the head of the bolt or screw is prevented from moving in the axial direction by the article and as it continues to be screwed into the threaded opening 16 it exerts an axially compressive force on the legs 11, 12 and their component axially extending webs 14. The webs forming the legs are shaped to deform radially outwardly under such compressive force so that the portion of the dowel body 10 extending into the hollow space buckles radially outwardly and engages the surface of the receiving material within the hollow space providing a form locking engagement with the receiving material for securing the dowel in position. The tabs 22 serve to hold the dowel against rotation so that the threading action can proceed and provide the desired compressive force.

While specific embodiments of the invention have been shown and described in detail to illustrate the application of the inventive principles, it will be understood that the invention may be embodied otherwise without departing from such principles.

What is claimed is:

1. Dowel for attaching articles to the surface of a receiving material, such as a ceiling or a wall, which contains a hollow space inwardly of the surface through which the dowel extends and into which hollow space the dowel extends, said dowel comprising an axially extending tubular-shaped dowel body having a leading end which is inserted through the surface of the receiving material and into the hollow space, and a trailing end, said dowel body including an end part at the leading end thereof extending transversely of the axial direction of said dowel body and having a threaded opening extending therethrough with the axis of the opening extending in the axial direction of said dowel body, said dowel body including a pair of legs extending axially from said leading end to the trailing end, a flange member attached to the trailing end of said legs, said flange member comprising an annular flange part extending transversely of the axial direction of said dowel body and a sleeve-shaped projection extending substantially perpendicularly of said flange part, wherein the improvement comprises that said legs being in circumferentially spaced relation relative to one another in the axial diirection of said dowel body from the trailing ends thereof to adjacent said end part said sleeve-shaped projection and a portion of said legs extending from the trailing end thereof are axially coextensive, said sleeve-shaped projection extends into and between the trailing ends of said legs and said sleeve-shaped projection, said legs have radially inwardly directed recesses formed at the trailing ends with said recesses providing line contact extending in the axial direction of said dowel body with said sleeve-shaped projection, and said legs being resistance-welded to said sleeve-shaped projection along the line contact afforded by said recesses.

2. Dowel, as set forth in claim 1, wherein said end part at the leading end of said dowel body is formed integrally with said legs and said legs are bent out of the plane of said end part approximately perpendicularly thereto.

3. Dowel, as set forth in claim 2, wherein said threaded opening is located coaxially with the axis of said dowel body.

4. Dowel, as set forth in claim 1, wherein tabs are bent up out of said flange part and extend toward the leading end of said dowel body, said tabs being bent so that they are forced back into the plane of said flange part as said flange part is pressed against the surface of the receiving material and said tabs in contact with the surface of the receiving material effect a holding action against rotation of said flange part and dowel body.

5. Dowel, as set forth in claim 1, wherein each of said legs has an axially extending slot therein dividing said legs into axially extending webs, said webs having an arcuate shape in the transverse section of said dowel body and the ends of said slots spaced apart in the axial direction of said dowel body being spaced from the leading end and trailing end of said dowel body so that the axial length of said slots is less than the axial length of said legs.

6. Dowel, as set forth in claim 5, wherein said webs are shaped to deform generally radially outwardly when an axially directed compressive force is applied to said dowel body.

7. Method of assembling a dowel used for attaching articles to the surface of a receiving material, such as a wall or ceiling, which contains a hollow space located inwardly of the surface through which the dowel extends and into which hollow space the dowel extends, comprising the steps of cutting a narrow strip of material having two elongated sides and two narrow ends extending between the sides, shaping the strip of material with an end part spaced approximately equidistantly from each end of the strip and a leg extending in the length direction of the strip from each of the opposite sides of the end part to the adjacent end of the strip, forming a threaded opening through the end part, forming an elongated narrow slot in each leg extending in the direction between the end part and the end of the leg spaced from the end part with the ends of the slots spaced from the end part and the end of the strip respectively so that the slot in each leg divides the leg into elongated webs, bending each leg substantially perpendicularly to the end part with the legs disposed opposite one another and forming a tubular-shaped body, pressing recesses in the ends of said legs spaced from said end part with the recesses extending inwardly into the tubular shaped body for forming lines of contact extending in the axial direction of the tubular-shaped body, forming a flange member having an annular flange part with a radially outer peripheral edge having a diameter significantly greater than the diameter of the tubular-shaped body and a sleeve-shaped projection extending from one side of and substantially perpendicularly to the flange part with the projection having an outside diameter so that it fits within the tubular-shaped body, inserting the projection on the flange member between the ends of the legs spaced from the end part of the dowel body, and resistance welding the legs and the projection on the flange member at the location of the lines of contact formed by the recesses in the end of said legs.

8. Method, as set forth in claim 7, including forming said legs with an arcuate transverse configuration.

9. Method, as set forth in claim 7, including bending tabs upwardly out of the circumferential periphery of the flange part of said flange member with the tabs being bent so that on contact with the surface of the receiving material into which the dowel is inserted the tabs tend to return back into the plane of the flange part.

* * * * *